(12) United States Patent
Alfier et al.

(10) Patent No.: US 9,903,998 B2
(45) Date of Patent: Feb. 27, 2018

(54) LIGHTING DEVICE AND CORRESPONDING METHOD

(71) Applicant: OSRAM GmbH, Munich (DE)

(72) Inventors: Alberto Alfier, Vedelago (IT); Simon Bobbo, Mirano (IT)

(73) Assignee: OSRAM GMBH, Munich (DE)

( * ) Notice: Subject to any disclaimer, the term of this patent is extended or adjusted under 35 U.S.C. 154(b) by 60 days.

(21) Appl. No.: 14/993,144

(22) Filed: Jan. 12, 2016

(65) Prior Publication Data

US 2016/0202407 A1 Jul. 14, 2016

(30) Foreign Application Priority Data

Jan. 14, 2015 (IT) ............................... TO2015A0030

(51) Int. Cl.
*F21V 8/00* (2006.01)
*F21V 3/04* (2018.01)
(Continued)

(52) U.S. Cl.
CPC .............. *G02B 6/0041* (2013.01); *F21S 4/22* (2016.01); *F21V 3/0445* (2013.01); *F21V 9/08* (2013.01); *G02B 6/0021* (2013.01); *G02B 6/0035* (2013.01); *G02B 6/0073* (2013.01); *F21K 9/90* (2013.01); *F21V 15/013* (2013.01); *F21Y 2103/10* (2016.08); *F21Y 2115/10* (2016.08)

(58) Field of Classification Search
CPC ....... F21K 9/60; F21S 4/20; F21S 4/22; F21S 4/28; F21V 15/013; F21V 3/0445; F21V 9/08; F21V 9/00; F21Y 2103/10; F21Y 2115/10
See application file for complete search history.

(56) References Cited

U.S. PATENT DOCUMENTS 7,011,421 B2 * 3/2006 Hulse ..................... G02B 6/001
362/219
9,115,858 B2 * 8/2015 Levante .................. F21S 4/005
(Continued)

FOREIGN PATENT DOCUMENTS

DE 102012214484 A1 2/2014

OTHER PUBLICATIONS

European Search Report based on Application No. EP16150735(10 Pages) dated May 13, 2016 (Reference Purpose Only).
(Continued)

*Primary Examiner* — Peggy Neils
(74) *Attorney, Agent, or Firm* — Viering, Jentschura & Partner mbB

(57) ABSTRACT

A lighting device includes an elongated profiled body including at least one light permeable material, e.g. a polymeric material, having a mouth portion where an e.g. white light radiation source assembly is arranged which includes one or more electrically powered light radiation sources facing the profiled body. The light radiation emitted by the light radiation source assembly propagates through the light permeable material of the profiled body. The material of the profiled body includes pigments and is at least in part light diffusive, whereby, by propagating through profiled body, the light radiation becomes a colored light radiation of a color determined by the pigments and with a homogeneous near field distribution.

8 Claims, 1 Drawing Sheet

(51) Int. Cl.
*F21V 9/08* (2018.01)
*F21S 4/22* (2016.01)
*F21K 9/90* (2016.01)
*F21V 15/01* (2006.01)
*F21Y 103/10* (2016.01)
*F21Y 115/10* (2016.01)

(56) References Cited

U.S. PATENT DOCUMENTS

| | | | |
|---|---|---|---|
| 9,696,016 B2* | 7/2017 | Alfier | F21V 3/0445 |
| 2011/0176298 A1* | 7/2011 | Meurer | F21K 9/00 |
| | | | 362/218 |
| 2014/0264409 A1* | 9/2014 | Ashdown | H01L 33/504 |
| | | | 257/98 |
| 2014/0306599 A1 | 10/2014 | Edwards et al. | |

OTHER PUBLICATIONS

Italian Search Report based on Application No. TO2015A000030 (5 Pages and 2 pages of English translation) dated Sep. 9, 2015 (Reference Purpose Only).

* cited by examiner

LIGHTING DEVICE AND CORRESPONDING METHOD

CROSS-REFERENCE TO RELATED APPLICATION

This application claims priority to Italian Patent Application Serial No. TO2015A000030, which was filed Jan. 14, 2015, and is incorporated herein by reference in its entirety.

TECHNICAL FIELD

Various embodiments may generally relate to lighting devices.

Various embodiments may refer to lighting devices employing solid-state, e.g. LED, light radiation sources.

BACKGROUND

Lighting devices implemented as flexible linear modules are available on the market. Such devices also come in a "protected" version, with a flexible light engine embedded in a flexible case which may be made e.g. of polymer materials. The case protects the light engine from the outer environment, with a minor impact on light output performance.

An emerging trend in the field is the production of protected modules adapted to provide a diffused lighting: the case may perform the optical function of homogenizing luminance on the outer surface of the device, by mixing the light radiation within itself. The single sources, i.e. for example the single LEDs, may not be visible any longer, even in the near field, i.e. when observed from a short distance.

In various implementations, such a lighting device or module may be implemented so that it may be bent up-down (or front-back): for example, the light radiation sources may be arranged on a support board (e.g. a Printed Circuit Board or PCB) positioned horizontally within the case, the light radiation being emitted vertically.

In the field the trend is also emerging to produce devices as previously outlined but having a specific colour, such as blue, red, green or other colours.

In this case a possible approach involves the use of e.g. monochromatic coloured LEDs on a linear flexible PCB, while embedding the assembly into a polymer with diffusive properties.

This solution may however give rise to various drawbacks. Among them we can mention the following drawbacks:
- current LED suppliers have a narrower monochromatic LED portfolio than in the case of white LEDs;
- technological improvements on monochromatic LEDs are slower than on white LEDs;
- monochromatic LEDs may have a bigger package size than white LEDs of equal power;
- monochromatic LEDs are more expensive than white LEDs of equal power;
- production results of monochromatic LEDs have a wider flux and voltage distribution than white LEDs; and
- suppliers do not usually offer a narrow selection.

SUMMARY

According to various embodiments, a lighting device is provided.

Various embodiments may also concern a corresponding method.

Various embodiments lead to the achievement of one or more of the following advantages:
- possibility to exploit technological and cost improvements already attained for white LEDs;
- possibility to exploit the performances of white LEDs in terms of narrow light flux and colour selection;
- use of the same flexible unprotected light engine, with the possibility of changing the colour emitted by the device by simply changing the blend of the coloured layer;
- the appearance of the module when off is not appreciably affected by the inner coloured layer, the main colour being given by a white external diffusive layer; and
- possibility to realize specific light colour modules by modifying the pigment recipe of a coloured layer blend.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DETAILED DESCRIPTION

Figure 1:
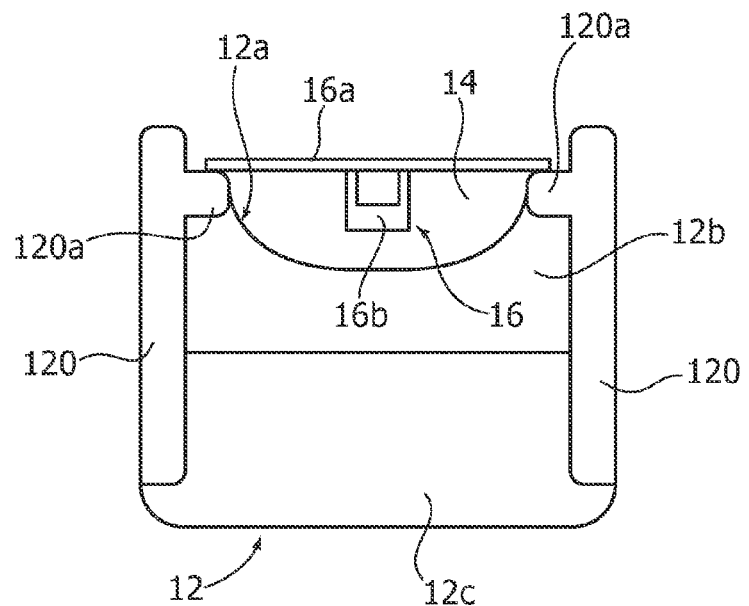
FIG. 1 is a cross-section view of a lighting device according various embodiments, during the manufacturing step thereof.

In the following description, numerous specific details are given to provide a thorough understanding of one or more exemplary embodiments. The embodiments may be practiced without one or several specific details, or with other methods, components, materials, etc. In other instances, well-known structures, materials, or operations are not shown or described in detail to avoid obscuring various aspects of the embodiments. Reference throughout this specification to "one embodiment" or "an embodiment" means that a particular feature, structure, or characteristic described in connection with the embodiment is included in at least one embodiment. Thus, the possible appearances of the phrases "in one embodiment" or "in an embodiment" in various places throughout this specification are not necessarily all referring to the same embodiment. Furthermore, particular features, structures, or characteristics may be combined in any suitable manner in one or more embodiments, and/or may be associated to the embodiments in a different way from what is shown herein, so that e.g. a feature herein exemplified in connection to a Figure may be applied to one or more embodiments exemplified in a different Figure.

The headings provided herein are for convenience only, and therefore do not interpret the extent of protection or meaning of the embodiments.

In the Figures, reference 10 denotes a lighting device adapted to be implemented, in various embodiments, as an elongated module (e.g. a bar or a tape), possibly flexible and/or adapted to be cut to length according to the application and use requirements.

As regards the present case, device 10 may therefore be considered as an element of indefinite length, shown in the views of the Figures in cross-section with respect to the direction of the main extension thereof.

In various embodiments, device 10 may include an elongated profiled body 12, e.g. with a channel-like profile, adapted to have a mouth portion 12a between two lateral sides, which may be defined by two inserts 120 which extend lengthwise with respect to body 12, along the channel-like sides.

In various embodiments, the central part of body 12 and the inserts 120 may be obtained through one single co-extrusion process.

In various embodiments, body 12 may include—according to criteria to be better detailed in the following—one or more light-permeable, i.e. transparent, materials, the lateral inserts 120 (if present) being adapted to include a light-impermeable material, e.g. an opaque and possibly white material.

In various embodiments, mouth portion 12a of profiled body 12 may house, possibly with the interposition of a polymeric layer 14 of light-permeable material, a light engine 16.

In various embodiments, the light engine is a (at least substantially) white light radiation source.

In various embodiments, light engine 16 may include:
a support board 16a, substantially similar to a Printed Circuit Board (PCB), and
one or more electrically powered light radiation sources 16b, arranged on the face of support board 16a facing profiled body 12.

In various embodiments, sources 16b may be solid-state light radiation sources, such as e.g. LED light radiation sources.

In various embodiments, both body 12 (optionally including the lateral inserts 120) and light engine 16 may be implemented so as to be flexible, e.g. in an up-down direction with respect to the viewpoint of the Figures.

In various embodiments, the central part of profiled body 12, which may be obtained, in a way known in itself, through an extrusion process, may comprise two components:
a first layer 12b, facing light engine 16, including a coloured material (e.g. a polymer such as silicone) which is transparent or partially diffusive, i.e. permeable to light radiation, the coloured (i.e.) non-white appearance whereof may be achieved with pigments—of various kinds, according to the colour—which which are mixed into the polymer through a well-known technique in extrusion processes; and
a second layer 12c, on the opposite side of the light engine 16, i.e. facing towards the outer side of device 10, including a material (such as a polymer material as silicone) which is partially diffusive, i.e. permeable to light radiation, the diffusive behaviour whereof may be obtained e.g. with diffusive particles (e.g. $Al_2O_3$) which are mixed into the polymer, again through a well-known technique in extrusion processes.

Pigments adapted to be used in various embodiments are well known in the art, for example from reference texts such as Additives for Plastics Handbook, Edited by J. Murphy, chapters 6 and 7, Elsevier, November 2001, ISBN 978-1-85617-370-4.

In various embodiments, lateral inserts 120 may finish off the group, which may be co-extruded simultaneously with all the three components thereof: layer 12b, layer 12c and lateral inserts 120.

In various embodiments, the layers which are permeable to light radiation, i.e. layer 12a and layer 12b, transmit light radiation while lateral inserts 120, which can be made of a light impermeable material, e.g. an opaque material, may be useful to tail the light radiation output direction through the light-permeable layers.

In various embodiments, profiled body 12 may be shaped so as to include one side wherein the light radiation is generated at the mouth portion 12a, where light engine 16 is located (top part of the Figures), one side wherein the light emission takes place from device 10 (bottom part of the Figures) and two lateral sides (which may be defined by inserts 120) performing a "recycling" function of light radiation.

Figure 2:
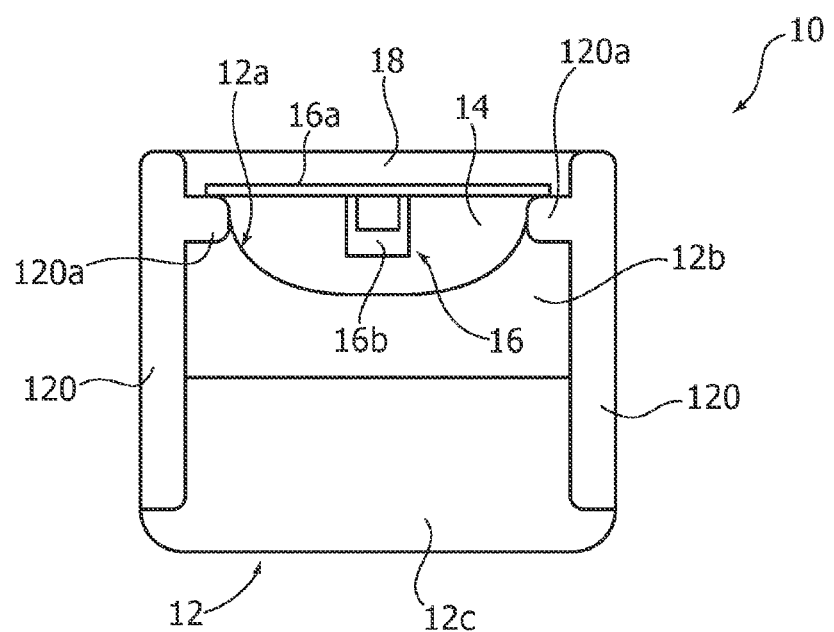
FIG. 2 is a cross-section view of a lighting device according various embodiments, during the manufacturing step thereof.

The sequence of FIGS. 1 and 2 is an illustration of possible implementation criteria of a device 10 as exemplified herein.

For example a transparent polymer 14, such as silicone, may be dispensed on the side of profiled body 12 (e.g. at mouth portion 12a) adapted to face light engine 16, so as to act as a "glue" to fix light engine 16 on profiled body 12.

Light engine 16, therefore, may be laminated on material 14, the light radiation sources 16b facing profiled body 12.

The assembly, then, may undergo a curing process.

A transparent polymer 18, such as e.g. silicone, may be dispensed onto the back side of light engine 16, i.e. on the side of board 16a facing outside device 10, as can be seen in FIG. 2.

The assembly may then be subjected again to curing in order to stiffen material 18, so as to seal device 10 from the outside.

In use, the light radiation emitted from source(s) 16b is directed towards layer 12b of a coloured material, which is adapted to act as a colour filter, by absorbing a certain fraction of the colour radiation spectrum (e.g. a substantially white fraction, but the effect may be achieved with a non-white radiation as well) which is emitted e.g. by sources such as LEDs 16b, so as to originate a coloured flux, i.e. a coloured radiation having a colour which is determined (directly or through a synthesis with the colour of source 16) by the colour of layer 12b, i.e. for example by the colour of the pigments mixed into the material of layer 12b.

The coloured light flux thus generated may then pass into diffusive layer 12c, which is adapted to form, onto the outer surface thereof (i.e. the face of profiled body 12 which is turned towards the outside of device 10), a homogeneous near field light distribution.

Thanks to their opaqueness (being impermeable to light radiation) and optionally to their white colour, lateral inserts 120, if present, may cooperate in conveying towards said output face the light radiation which would otherwise exit through the lateral sides of profiled body 12.

In various embodiments, as exemplified in the Figures, lateral inserts 120 may have protuberances 120a projecting (continuously or discontinuously along the length of device 10) towards the interior of profiled body 12, so as to form shoulders against which support board 16a of light engine 16 may abut.

In various embodiments, the profile of body 12 may be implemented so as to be recessed at mouth portion 12a. In this way it is possible to create a convex surface (the convexity facing towards the interior of body 12) through which the light radiation emitted by source(s) 16b passes into body 12.

The shoulders formed by protuberances 120a on both sides of mouth portion 12a are adapted to form a mechanical reference for mounting light engine 16, the support board 16a being adapted to abut against such shoulders irrespective of the size of light radiation source(s) 16b.

As a consequence, while being able to adapt the possible quantity of mounting material (lamination) 14 which may be arranged in said recessed part, the use of different light radiation sources (and/or of components such as drivers associated thereto), adapted to cause a change of the volume encompassed with the recessed profile of mouth portion 12a, does not affect the position of board 16a. As a matter of fact, such a position is defined by the sides of said board, which abut against protuberances 120a.

In various embodiments, the previously exemplified functions which were performed by two separate layers, i.e. layer 12b (colour filter with the generation of a coloured light flux) and layer 12c (creation of a uniform light output distribution in the near field) may be joined into one single layer. The latter may consist e.g. of an extruded layer, which is obtained by mixing, into a transparent polymer (e.g. silicone), both pigments and diffusive particles.

In various embodiments it is therefore possible to simplify the extrusion process, by reducing the number of the materials to be co-extruded. On the other hand, by resorting to such a solution, when the light radiation sources are off the central extruded material (e.g. a polymer) appears as coloured in the same colour of the pigment.

A similar situation may occur in various embodiments wherein, with two layers like layers 12b and 12c, and unlike what is exemplified in the annexed Figures (wherein coloured layer 12b and diffusive layer 12c respectively face and oppose mouth portion 12a, i.e. wherein the former faces light engine 16 and the latter is arranged towards the external part of device 10), coloured layer 12b is arranged towards the exterior of device 10, while diffusive layer 12c faces light engine 16. In this case, the light radiation generated by light engine 16, instead of first intercepting the coloured layer and then the diffusive layer (as in the case exemplified in the Figures) will first intercept the diffusive layer and then the coloured layer.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A lighting device, comprising:
   an elongated profiled body including at least one light permeable material, said profiled body having a mouth portion, and
   a light radiation source assembly arranged at said mouth and including at least one electrically powered light radiation source arranged on a support board facing said profiled body, whereby light radiation emitted by said light radiation source assembly propagates through said at least one light permeable material of the profiled body,
   wherein said profiled body includes two lateral inserts of a light impermeable material extending lengthwise of said profiled body,
   wherein said lateral inserts have protuberances protruding inwardly of the profiled body to provide abutment formations with said light radiation source assembly abutting against said protuberances;
   a layer of sealing material of the device applied on the side of said light radiation source assembly opposed to said profiled body; and the layer of sealing material is disposed onto the side of the support board facing outside the lighting device;
   wherein said material of the profiled body includes pigments and is at least in part light diffusive, whereby, by propagating through said profiled body, said light radiation becomes a coloured light radiation of a colour determined by said pigments and with a homogeneous near field distribution.

2. The lighting device of claim 1, wherein said light permeable material comprises:
   a first layer including pigments, whereby, by propagating through said first layer, said light radiation becomes a coloured light radiation with a colour determined by said pigments, and
   a second, light diffusive layer, whereby, by propagating through said second layer, said light radiation assumes a homogeneous near field distribution,
   said first layer and said second layer being facing and opposed said mouth portion, respectively.

3. The lighting device of claim 1, wherein said profiled body includes a single layer which includes pigments and is light diffusive, whereby, by propagating through said single layer, said light radiation becomes a coloured light radiation with a colour determined by said pigments and with a homogeneous near field distribution.

4. The lighting device of claim 1, further comprising a filling of a light permeable material between said light radiation source assembly and said profiled body.

5. The lighting device of claim 1, wherein said profiled body is recessed at said mouth portion.

6. The lighting device of claim 1, wherein:
   said at least one light radiation source is an LED source, and
   said profiled body is a profiled extruded body.

7. A method of providing a lighting device, comprising:
   providing an elongated profiled body including at least one light permeable material, said profiled body having a mouth portion,
   arranging at said mouth portion a light radiation source assembly including at least one electrically powered light radiation source on a support board facing said profiled body, whereby the light radiation emitted by said light radiation source assembly propagates through said at least one light permeable material of the profiled body,
   including in said profiled body two lateral inserts of a light impermeable material extending lengthwise of said profiled body, wherein the lateral inserts have protuberances protruding inwardly of the profiled body,
   providing abutment formations with said light radiation source assembly abutting against said protuberances; and
   including in said material of the profiled body pigments and light diffusive means whereby, by propagating through said profiled body, said light radiation becomes a coloured light radiation of a colour determined by said pigments and with a homogeneous near field distribution.

8. The lighting device of claim 1, wherein:
   said at least one light radiation source is an LED source or
   said profiled body is a profiled extruded body.

* * * * *